United States Patent [19]
Rothamel

[11] Patent Number: 5,831,152
[45] Date of Patent: Nov. 3, 1998

[54] WHEEL BALANCING MACHINE

[75] Inventor: Karl Rothamel, Seeheim, Germany

[73] Assignee: Hofmann Werkstatt-Technik GmbH, Pfungstadt, Germany

[21] Appl. No.: 857,652

[22] Filed: May 16, 1997

Related U.S. Application Data

[63] Continuation of Ser. No. 505,478, Jul. 21, 1995, abandoned, which is a continuation of Ser. No. 194,288, Feb. 10, 1994, abandoned.

[30]     Foreign Application Priority Data

Feb. 12, 1993 [DE] Germany ............... G 93 02 023.6

[51] Int. Cl.⁶ .................................................. G01M 1/00
[52] U.S. Cl. .................................... 73/66; 73/487
[58] Field of Search .................... 362/78, 42; 73/66, 73/437, 457, 462, 466, 460

[56]        References Cited

U.S. PATENT DOCUMENTS

| 2,004,270 | 6/1935 | Davey | 73/66 |
| 3,499,136 | 3/1970 | Nunnikhoven | 73/66 |
| 3,636,773 | 1/1972 | Harant | 73/466 |

FOREIGN PATENT DOCUMENTS

| 0565320 | 10/1993 | European Pat. Off. . |
| 2674331 | 9/1992 | France . |
| 2163845 | 9/1972 | Germany . |
| 4101921 | 8/1991 | Germany . |
| 4325533 | 2/1995 | Germany .............. 73/66 |
| 56-157829 | 12/1981 | Japan . |
| 2-296125 | 12/1990 | Japan ................. 73/66 |
| 1380479 | 1/1975 | United Kingdom ....... 73/66 |
| 2241061 | 8/1991 | United Kingdom ....... 73/460 |

*Primary Examiner*—Christine K. Oda
*Attorney, Agent, or Firm*—Cushman Darby & Cushman Intellectual Property Group of Pillsbury Madison & Sutro LLP

[57]          ABSTRACT

A wheel balancing machine that includes a lighting device to illuminate the inside of the wheel or rim bowl facing the wheel balancing machine. Illumination preferably occurs in an area above the shaft on which the wheel is mounted and improves the task of correctly positioning and attaching balancing weights.

3 Claims, 2 Drawing Sheets

WHEEL BALANCING MACHINE

This is a continuation of application Ser. No. 08/505,478, filed on Jul. 21, 1995, which was abandoned upon the filing hereof, which was a continuation of abandoned Ser. No. 08/194,288, filed Feb. 10, 1994.

FIELD OF THE INVENTION

The invention relates to a wheel balancing machine with a main shaft seated in a device for measuring an imbalance, which is disposed in a machine frame, wherein a shaft end projects from the machine frame, to which a motor vehicle wheel can be fastened by means of a clamping device.

BACKGROUND OF THE INVENTION

After the motor vehicle wheel has been clamped to the shaft end of the wheel balancing machine, little ambient light enters the rim bowl facing the housing of the balancing machine. An additional deterioration of the light conditions results, if the solid wheel is painted black. Because of this, the application of adhesive weights, and covered adhesive weights in particular which do not have an effect on the exterior appearance of the solid wheel, is made difficult.

OBJECT AND SUMMARY OF THE INVENTION

It is therefore the object of the present invention to simplify the process of correctly positioning and inserting weights, and in particular adhesive applied weights, into he rim bowl of the clamped motor vehicle wheel.

This object is attained by means of the invention in connection with the previously described wheel balancing machine in that an illuminating device is provided to radiate light at least in the direction above the end of the shaft projecting from the machine housing, and preferably perpendicularly above the projecting end. The area to be illuminated is preferably an angular area (the illuminated area), that includes a portion of rim bowl of the motor vehicle wheel clamped on the projecting end of the main shaft.

With the wheel being illuminated in this manner, it is possible to exactly recognize and distinguish between the various shapes and formations of the solid wheel, or of the rim bowl, in the illuminated area. The illuminated area should be located above the end of the main shaft projecting from the machine housing. The balancing weights are usually attached to the solid wheel or the rim when rotated into an area above the shaft after the motor vehicle wheel has been turned into the respective compensation position following imbalance the measuring process. Since this area of wheel can now be illuminated, it is possible to attach the balancing weight(s), for example by gluing, in the respective and correct compensation plane which is in the illuminated rim bowl area. It is also possible, in this manner, to attach so-called hidden weights in the correct position on the solid wheel. The illuminating device can be fastened to the machine frame or to any other portion of the balancing machine that permits light to be focused on the desired interior portion of the rim.

To prevent dazzling or blinding of the operator by the illuminating device, it is possible to provide a screen, by means of which at least the space located above the illuminated area is shaded.

The illuminating device can have a light bulb, the light of which is directed into the illuminated area with the aid of a reflector. Alternative light sources could also be employed, such as incandescent bulbs, halogen bulbs, or other filament or light emitting sources. The main switch of the machine can be used for turning the illuminating device on. However, it is also possible to provide a switch, in particular an electronic switch, which turns the illuminating device on or off as a function of a working or operating situation noted in the electronic measuring and control device of the balancing machine. For example, the switch can be triggered as a function of the selected weight placement, the extension of the scanning rod and the clamping state of a power clamping device, or other similar operating procedure. Alternatively, the illumination device can be turned on when a motor vehicle wheel is clamped to the shaft end.

The invention will be described in more detail by means of an exemplary embodiment in conjunction with the drawings.

DETAILED DESCRIPTION OF THE EXEMPLARY EMBODIMENT

Figure 1:
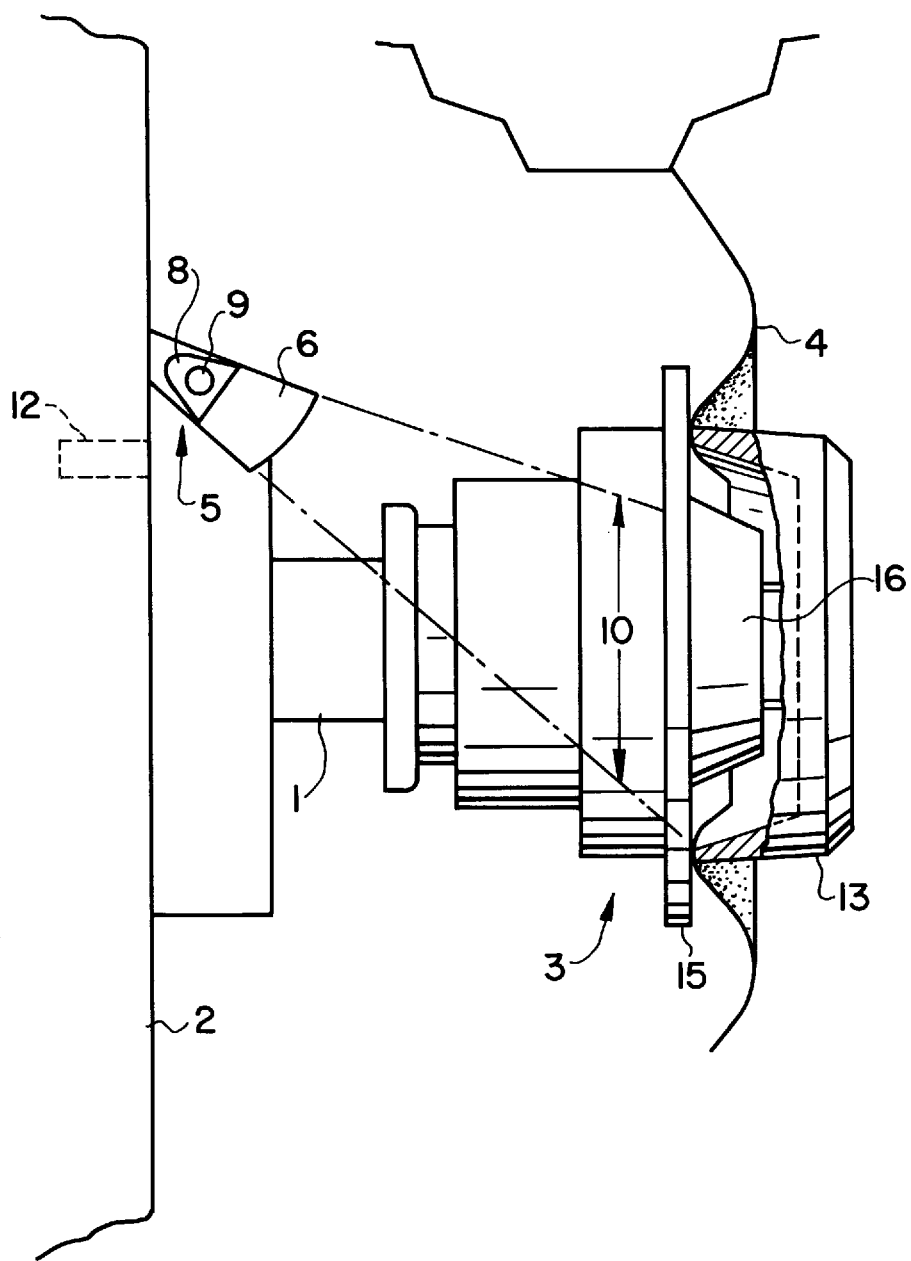
FIG. 1 is a view from above on an exemplary embodiment.

In the exemplary embodiment of the wheel-balancing machine, the machine housing is shown in the area where a shaft end 1 of the main shaft projects out of the machine housing 2. The main shaft is seated in a known manner (for example, German Published, Examined Patent Application DE-AS 27 01 876) in the machine housing 2 in an imbalance measuring device, not shown in detail. A motor vehicle wheel 4, of which the solid wheel is schematically indicated in the drawing figures, can be clamped in a centered manner on the shaft end 1 projecting from the machine housing 2 with the aid of a clamping device 3. For this purpose, the clamping device essentially contains a clamping flange 15, a centering cone 16 and a clamping cup 13.

An illuminating device, generally indicated at 5, is used for illuminating an illuminated area 10 located above, and preferably perpendicularly above, the shaft end 1 where it projects from the machine housing 2. This illuminating device 5 can be fastened on the machine housing 2 in any convenient manner, preferably at a position behind the shaft end 1 or towards housing 2, as can be seen in FIG. 1.

Figure 2:
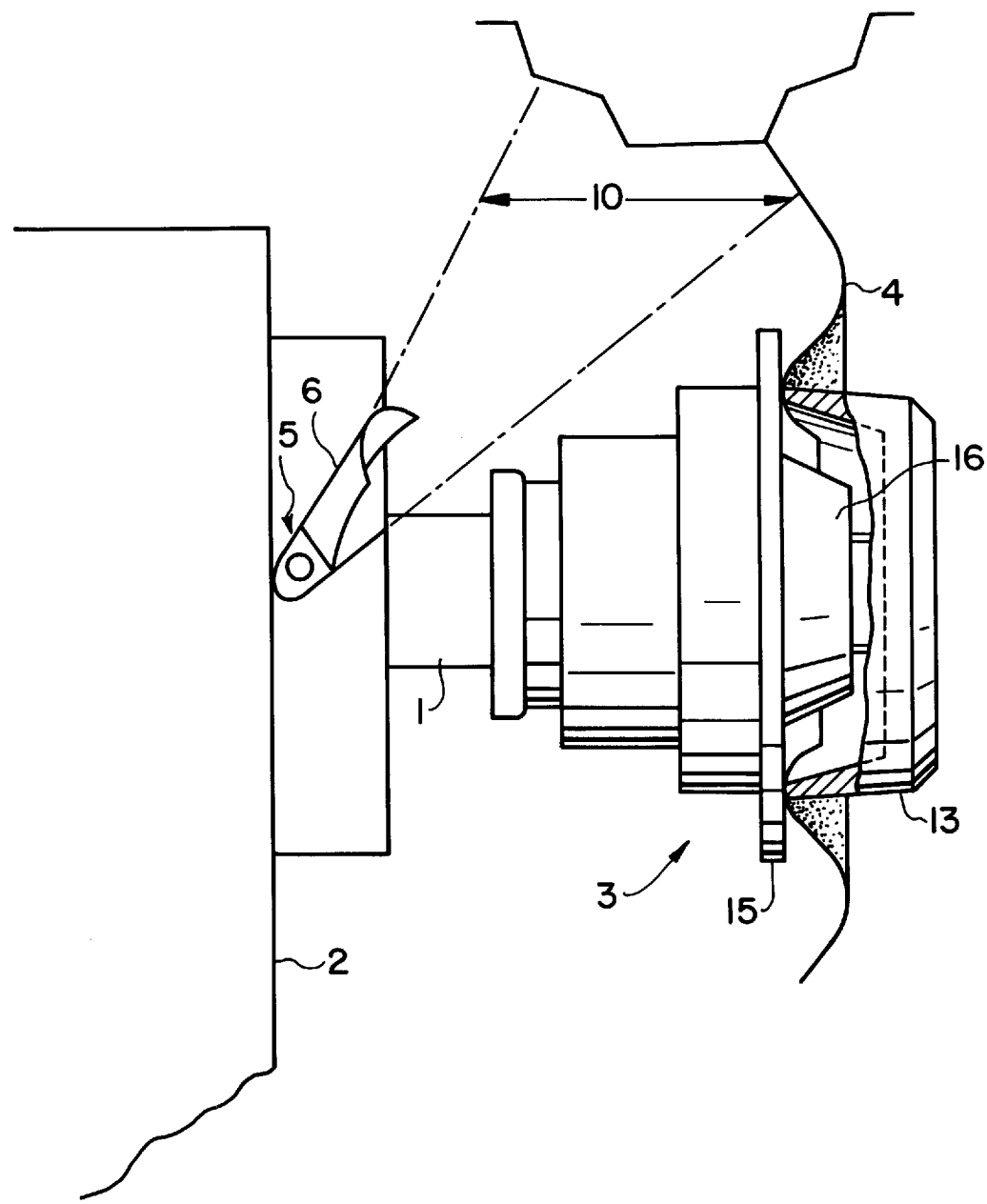
FIG. 2 is a side view, in particular the back, of the exemplary embodiment of FIG. 1.

Essentially, the illuminating device 5 is comprised of a light bulb 9 and a reflector 8, which directs the light emitted by the light bulb 9 into the illuminated area 10. It is assured by means of a screen 6 that the operator is not blinded or dazzled by the emitted light. As shown, for example, in FIGS. 1 and 2, screen 6 comprises a light-deflecting shield, disposed adjacent the illuminating device 5 and extending outwardly from the housing 2. The illuminated area 10 is disposed in such a way that the rim bowl area, located in the interior of the mounted motor vehicle wheel 4 and lying perpendicularly above the shaft end 1, is illuminated. In the course of compensating for imbalance, the relative compensation positions of the motor vehicle wheel, that is the area where balancing weights are to be attached for the wheel 4, are brought into a position where that area of wheel 4 will be illuminated. Then, with this area located within the illuminated area 10, the balancing weights can be fastened in the compensation planes intended therefor when these are turned into these relative compensation positions. Since the area of this relative compensation position is illuminated, the exact application of the balancing weights is made considerably easier, in particular when these are balancing weights which are to be placed in the rim bowl in an area that is otherwise hidden from easy view or deep within the rim bowl.

A switch 12, embodied as an electronic switch, can be used for turning on the illuminating device 5. This switch 12 is controlled via the electronic measuring and control device of the balancing machine as a function of the following operational states:

a. with selected weight placement of adhesive weights, b. when the distance-diameter scanning rod leaves its position of rest, c. in machines with a power clamping device only when the wheel is clamped.

It is also possible that the illuminating device 5 is turned on by means of the main switch of the machine. It is furthermore possible that a pause in the operation of the wheel-balancing machine is detected by the electronic measuring and control device, not shown in detail, and the illuminating device 5 is switched off at that time.

What is claimed is:

1. A wheel balancing machine including a wheel imbalance measuring device, said wheel balancing machine comprising:

a machine frame;

a main shaft seated in the wheel imbalance measuring device and disposed on said machine frame, said main shaft having a portion projecting outwardly from said machine frame;

a clamping device constructed and arranged to secure a motor vehicle wheel to said outwardly projecting portion of said main shaft, the motor vehicle wheel having a rim including a rim bowl;

an illuminating device including a light emitting source and a reflector mounted to said machine frame at the same height as said main shaft and to one side of said main shaft, said reflector being disposed with respect to said light emitting source to radiate light emitted by said light emitting source toward an illuminated area of the rim bowl lying perpendicularly above said outwardly protecting portion of said main shaft and deep within an interior region of the rim bowl where an adhesive weight is applied to the rim bowl;

a screen constructed and arranged to prevent light radiated from said illumination device from illuminating a space located above the illuminated area, said screen comprising a light-deflecting shield disposed adjacent said illumination device and extending outwardly from said machine frame to prevent light radiated from said illumination device from radiating in a direction blocked by said light-deflecting shield and a switch for actuating the illuminating device as a function of a selected weight placement and the extension of a scanning rod.

2. A wheel balancing machine as in claim 1 said switch actuating the illuminating device as a function of clamping state of a power clamping device.

3. A wheel balancing machine as in claim 1 wherein the illuminating device further includes an incandescent bulb and a reflector which directs the light emitted by said bulb into the illuminated area.

* * * * *